Sept. 19, 1944.   J. W. ORENDORFF   2,358,531
UNIVERSAL CULTIVATOR TRIP SHOVEL
Filed Feb. 12, 1942
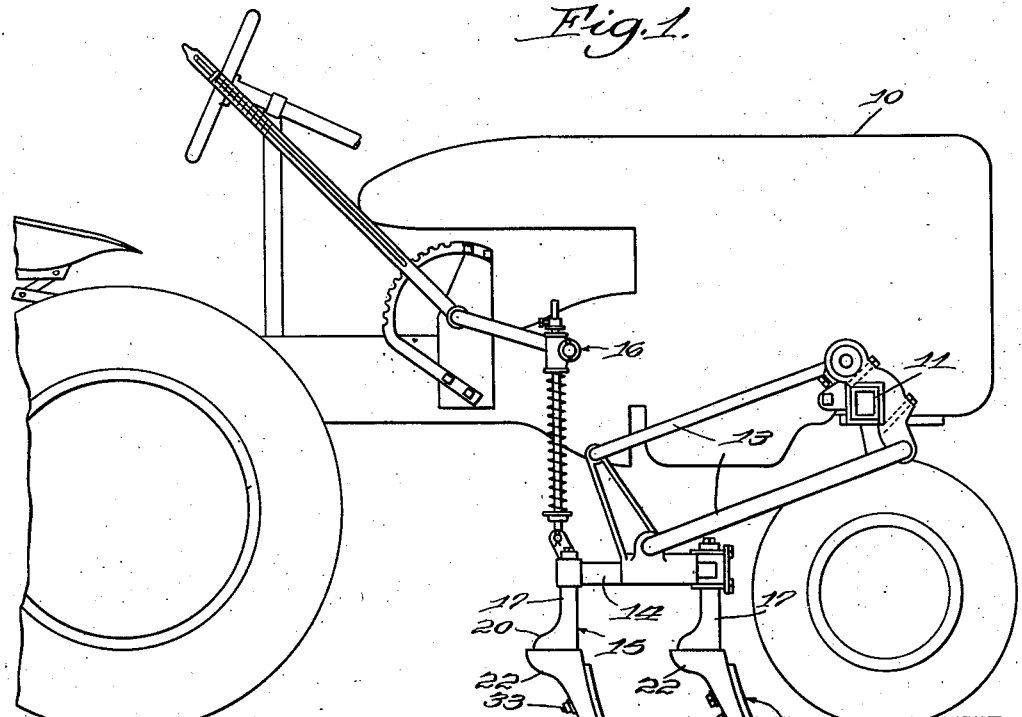
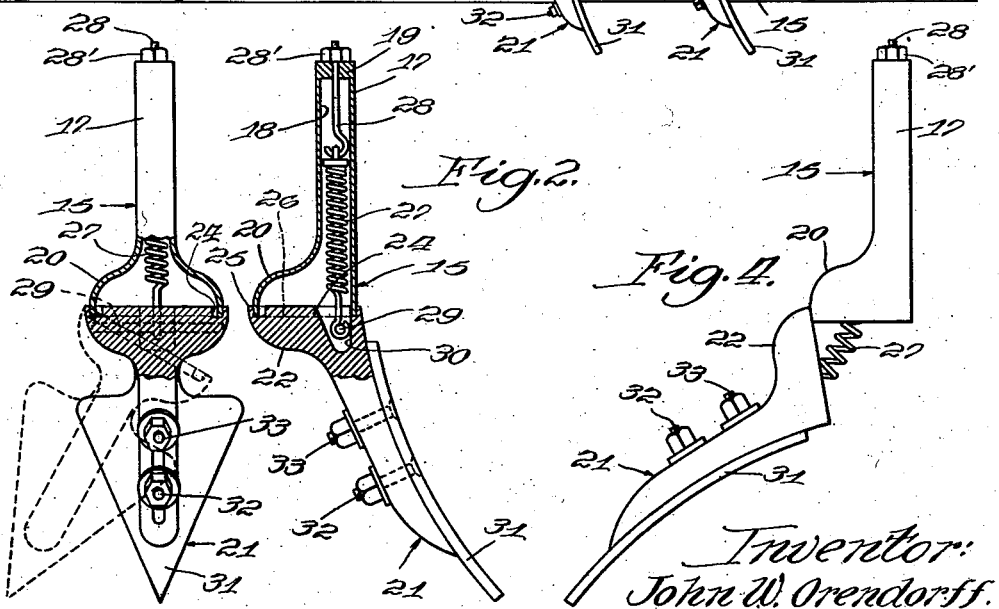
Inventor:
John W. Orendorff.
By Paul O. Rippel
Atty.

Patented Sept. 19, 1944

2,358,531

UNITED STATES PATENT OFFICE 2,358,531

UNIVERSAL CULTIVATOR TRIP SHOVEL

John W. Orendorff, Canton, Ill., assignor to International Harvester Company, a corporation of New Jersey Application February 12, 1942, Serial No. 430,645

3 Claims. (Cl. 97—184)

This invention relates to improvements in agricultural implements of the type generally known as cultivators and, more particularly, to an improved standard and shank construction for cultivator shovels or teeth.

During the operation of an agricultural implement such as a cultivator, it is desirable to connect the shovel or tooth-supporting shank to the supporting standard in a yieldable manner in order to allow the shank to give and absorb the shock when the tooth strikes an unusual obstruction. This is especially important to prevent unnecessary breaking and dulling of the cultivator teeth while operating under conditions where stones are frequently encountered.

Heretofore, spring trips have been provided which allow the shank to swing rearwardly upon the tooth striking an obstruction. However, these constructions allowed the shank tooth to swing in only one rearward direction, and no means was provided for absorbing the side thrust upon the tooth striking an obstruction from the side. As a result the breakage of the cultivator teeth was not greatly reduced despite the use of the spring trip mechanism.

The principal object, then, of this invention is to provide for an improved type of standard and shank construction. Another object is to provide an improved type of mechanism for yieldably connecting a tooth shovel to a standard.

A still further object is to provide a universal spring trip means for a standard and cultivator construction that will absorb unusual shocks coming from any direction.

According to the present invention, a cultivator standard is provided with an enlarged end portion. A shank, having a working tool connected thereto, is provided with a complementary end portion having a recess. This recess provides a seat into which the enlarged portion of the standard fits. The shank and standard are yieldably connected together by a spring extending within and connected to the standard.

Other objects and advantages of the invention will be apparent during the course of the following detailed description, taken in connection with the accompanying drawing, forming a part of this specification and in which drawing:

Figure 1 is a side elevational view of a tractor having an implement rig carried thereon and showing the manner in which the cultivator standards are carried by said rig;

Figure 2 is a side elevational view, partly in section, showing the standard and shank construction;

Figure 3 is a rear end view of the standard and shank having portions broken away; and Figure 4 is a side elevational view of the standard and shank showing the members partially separated.

As shown in Figure 1, a tractor 10 has mounted at its forward end a rig-carrying bracket 11, to which are connected a pair of parallel links 13. Connected to the parallel links 13 is a tool-supporting beam 14 on which is mounted a pair of working-tool supports generally designated at 15. A manually operable mechanism 16 is connected to the beam 14 for lowering and lifting the tool supports to and from a ground-working position.

As best shown in Figures 2 and 3, the tool support 15 includes a standard 17, comprising a vertically extending tubular portion, being formed with a hollow chamber 18 enclosed at one end by a portion as shown at 19. The other end of the standard 17 is formed with an enlarged offset portion 20.

A shank member 21 has an enlarged offset portion 22 at one end complementary to the offset portion 20 of the standard 17. This portion 22 is formed with a recess or groove 24 encircling the top face of the same and having a vertically extending flange 25. The enlarged portion 20 of the standard 17 is hollow, and its bottom edge fits into the recess or groove 24 and is seated upon an inner surface 26 of the enlarged portion 22.

The enlarged portion 20 of the standards 17 is retained in the recess or groove 24 by a biasing means in the form of a spring 27 extending vertically within the tubular portion of standard 17. The spring 27 is connected at one end to the standard 17 by a threaded means in the form of an eyebolt 28 extending through the portion 19 of the tubular portion of standard 17. A nut 28' is threaded to the eyebolt 28 and is used for adjusting the tension of the spring 27.

The spring 27 is connected to the shank member 21 by means of a pin 29 extending through the enlarged portion 22 and engaging one end of the spring 27 which extends into an opening 30 formed in the enlarged portion 22. It will be thus noted that the spring is entirely within the outer portions of the shank member 21 and standard 17. It should also be noted that the spring 27 is connected at the forward portion of the shank member 21 with respect to the direction of travel of said shank member, thus allowing full use of the leverage afforded by the enlarged portions 20 and 22.

A ground-working tooth 31 is connected to the shank by means of bolts 32 and 33. When an obstruction is encountered by the cultivator tooth 31, the shank will be forced either rearwardly, as shown in Figure 4, or sidewardly as shown in the dotted position of Figure 3, depending upon the angle of thrust of the obstruction. This movement will cause the enlarged portion 22 of the shank 21 to become separated from the enlarged portion 20 of the standard 17, and the spring 27 will absorb the shock and also return the parts to the former position after the obstruction is passed. Depending on the soil conditions, the tension of the spring 27 can be regulated by the eyebolt 28 and the nut 28'.

It is of course understood that various changes and modifications may be made in the specific form of the invention shown and described without departing from the spirit and scope of the invention as defined in the appended claims.

What is claimed is:

1. In combination, a ground-working tool including a tubular standard having an enlarged end portion, a shank member formed with a complementary enlarged end portion having a marginal recess thereabout providing a flanged seat for the aforesaid end portion to permit universal angular movement of said shank with respect to said standard, and means for yieldably connecting the shank member to the standard, including a resilient means connected to the shank and connected to and extending within the tubular standard.

2. In combination, a ground-working tool including a standard having an enlarged end portion, a shank having a complementary end portion formed with a marginal recess thereabout to provide a cup portion for seating the aforesaid enlarged end portion against lateral displacement, and means enclosed within the standard and the shank for yieldably connecting the said shank to said standard.

3. In an agricultural implement, a member having an enlarged end portion, a member formed with a complementary end portion, resilient means serving as the only connection between said members, a marginal recess about the end portion of one said member, and a flange on the end portion of the other said member arranged to fit within said recess to permit universal angular movement of one member with respect to the other while preventing lateral displacement of said one member with respect to said other member.

JOHN W. ORENDORFF.